(12) United States Patent
Pentz et al.

(10) Patent No.: US 6,401,757 B1
(45) Date of Patent: Jun. 11, 2002

(54) LOOSE-FILL INSULATION DISPENSING APPARATUS INCLUDING MESH CONDUIT LINER

(75) Inventors: Edward Pentz, Boyertown; Mark Trabbold, Harleysville, both of PA (US); M. Lillo Arnone, Bailleval (FR)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/995,220

(22) Filed: Nov. 26, 2001

(51) Int. Cl.[7] ............................................. F16L 55/18
(52) U.S. Cl. ..................... 138/37; 138/39; 239/590.3
(58) Field of Search ................... 138/37, 39; 239/590, 239/590.3, 590.5

(56) References Cited

U.S. PATENT DOCUMENTS

| | | | | |
|---|---|---|---|---|
| 3,347,469 A | * | 10/1967 | Ross et al. | ............... 118/629 |
| 4,487,227 A | * | 12/1984 | Meissner | .................. 138/103 |
| 4,865,255 A | * | 9/1989 | Luvisotto | .................... 239/149 |
| 4,976,289 A | * | 12/1990 | Umemori et al. | ........... 138/122 |
| 5,829,649 A | * | 11/1998 | Horton | ....................... 222/238 |
| 6,206,050 B1 | * | 3/2001 | Kelley et al. | ............... 138/122 |

* cited by examiner

*Primary Examiner*—Patrick Brinson
(74) *Attorney, Agent, or Firm*—Duane Morris LLP

(57) ABSTRACT

Dispensing equipment for dispensing blown loose-fill insulation. The equipment includes a flexible delivery conduit that conveys loose-fill insulation material from a source of such material and, possibly, an optional a rigid tubular wand connected to the distal end of the conduit. The equipment further includes an insert projecting radially inwardly into the loose-fill insulation flow path of the delivery conduit and/or wand for mechanically separating the insulation material's fibers and particles prior to discharge from the delivery conduit or wand. The insulation material separating structure conditions or "opens" the insulation material in such a way that the material is discharged in a substantially uniform density stream of substantially uniformly distributed fibers and particles.

27 Claims, 1 Drawing Sheet

LOOSE-FILL INSULATION DISPENSING APPARATUS INCLUDING MESH CONDUIT LINER

CROSS-REFERENCE TO RELATED APPLICATIONS

The present application is related to U.S. patent application Ser. No. 09/817,429, entitled IMPROVEMENT TO HOSE USED TO INSTALL LOOSE FILL INSULATION, filed Apr. 30, 2001 as a divisional of U.S. patent application Ser. No. 09/282,409, filed Mar. 31, 1999, U.S. Pat. No. 6,206,050, and U.S. patent application Ser. No. 09/845,889 now U.S. Pat. No. 6,336,474, entitled IMPROVEMENT TO HOSE USED TO INSTALL LOOSE FILL INSULATION, filed May 17, 2001 as a continuation-in-part of U.S. patent application Ser. No. 09/817,429.

FIELD OF THE INVENTION

The present invention relates in general to apparatus for dispensing blown, loose-fill insulation materials and in particular to apparatus for decreasing the density of such insulation as it is discharged from the apparatus.

BACKGROUND OF THE INVENTION

Because of cost-effectiveness, speed and ease of application, as well as thoroughness of coverage in both open and confined areas, the practice of using pneumatically delivered or "blown" loose-fill insulation materials, e.g., glass fiber, rock wool, mineral fiber wool, cellulose fibers, expanded mica, and the like, has become an increasingly popular method by which to install insulation in new and existing building constructions. The essential components of a typical blown loose-fill delivery system include a source of insulation material such as a hopper or the like, conduit means for conveying the material from the insulation source to the installation site, and a source of pressurized air such as a compressor, blower or the like, for generating a flow of pressurized air for entraining the fibrous and/or particulate loose-fill insulation material and delivering it from its source and through the conduit means for discharge at the installation site.

Loose-fill insulation blown into ceilings and outside wall cavities is very effective in reducing heat transfer in existing buildings. Exterior wall cavities of finished rooms may be filled with blown insulation through holes bored in exterior siding, or the like, without removing or cutting the interior wall surfacing materials. In addition, loose-fill blown insulation can be used in new construction, where insulative batts are often used.

Loose-fill insulation can provide a substantial advantage over batt-type insulation in that the loose-fill material readily assumes the actual shape of the interior cavity being filled, whereas the insulative batts are manufactured in a limited number of standard size widths, none of which will as closely match the actual dimensions of wall cavities or accommodate obstructions encountered in the field. Properly installed, loose-fill insulation essentially completely fills the wall cavity, conforming to the actual shape of the wall cavity, including obstructions, and provides, in that respect, effective resistance to heat transfer through the wall. Loose-fill insulation also lends itself to installation in ceilings, party walls and any other place where it is desired to resist heat transfer, as an alternative to batts, especially where there are obstructions such as, water, waste and gas lines, electrical conduits, heating and air conditioning ducts, etc.

In order to promote efficient use of energy required to heat and/or cool new buildings, many building codes require that new buildings be constructed to provide a certain minimum resistance to heat flow. To achieve this threshold, insulation is typically installed between one or more of a building's interior and exterior walls and possibly in superstructure and foundation areas such as crawl spaces, attics and basements. "R-value" refers to an insulation's thermal resistance or resistance to heat flow. The higher an insulation's R-value, the greater its thermal insulative capability. Existing building constructions can increase the R-value of their insulation by supplementing existing insulation with additional insulation.

The most influential factors for achieving a desired R-value when installing blown or pneumatically-delivered fibrous installation are the thickness and density of the material to be installed. In "open" areas such as attics, for example, insulation thickness or density is not normally of great concern. However, in confined areas such as the voids between interior and building walls the available insulation space may be quite limited. This physical constraint restricts installation of blown insulation beyond a certain thickness and thus may materially impact the available R-value for insulation present in such areas, especially if the insulation is installed at less than optimum consistency and density.

The insulation material used in conventional insulation blowing machines is typically in a relatively loose condition though usually packed under high compression in bags or sacks for shipment to the user. Upon being opened, these bags or sacks are typically manually emptied into a receiving hopper of a conventional insulation spraying or blowing machine. Once in the receiving hopper, the insulation material includes many relatively large compressed masses or clumps that may be difficult to feed through an air hose to a dispensing nozzle. And, even if the clumps are successfully dispensed they may produce an installed layer or volume of insulation material of inconsistent density and R-value. That is, the clumps themselves may have comparatively high R-values whereas the many void spaces between the clumps may have negligible R-values. Those of ordinary skill in the art of blown loose-fill insulation are aware that thermal performance of the installed material is optimized when its fibers and particles are dispensed and installed as uniformly distributed, finely separated fibers and particles rather than as clumps.

An advantage exists, therefore, for a blown loose-fill insulation dispensing apparatus that conditions the insulation material as it is discharged from the device such that the material is discharged in a substantially uniform density stream of separated fibers and/or particles.

SUMMARY OF THE INVENTION

The present invention provides apparatus for dispensing blown loose-fill insulation. The apparatus includes a flexible delivery conduit that conveys loose-fill insulation material from a source of such material and, possibly, an optional rigid tubular wand connected to the distal end of the conduit. According to a preferred embodiment, the apparatus further comprises a substantially cylindrical member that may be removably or permanently disposed within either or both of the flexible delivery conduit and rigid tubular wand connected thereto. The cylindrical member includes an insert projecting radially inwardly into the loose-fill insulation flow path of the delivery conduit or wand for mechanically separating the insulation material's fibers and particles prior to discharge from the delivery conduit or wand. In so doing, the insert conditions or "opens" the insulation material in such a way that the material is discharged in a substantially uniform density stream of substantially uniformly distributed fibers and particles.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments shown, by way of example only, in the accompanying drawings wherein.

DETAILED DESCRIPTION OF THE INVENTION

Figure 1:
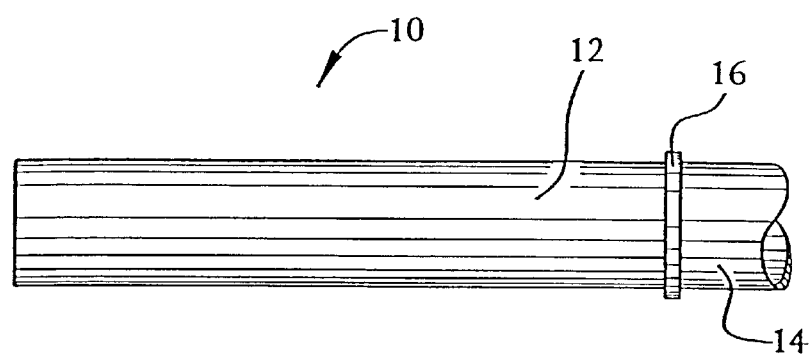
FIG. 1 is a side view of a conventional loose-fill insulation dispensing apparatus.

Referring to the drawings wherein like references indicate like or similar elements throughout the several figures, there is shown in FIG. 1 the dispensing apparatus 10 of a conventional loose-fill insulation delivery system. The essential components of any loose-fill insulation delivery system include a source of insulation material such as glass fiber or the like, conduit means, a compressor, blower or the like, and dispensing means attached to or constituted by the distal end of the conduit means. The compressor or blower generates a flow of pressurized air for entraining the fibrous insulation material and delivering it from the insulation source through the conduit means to the dispensing means for discharge at the installation site. Accordingly, only those loose-fill insulation material delivery system components which form a part of the present invention will be described in detail herein.

The conventional loose-fill insulation dispensing apparatus 10 may comprise an optional lightweight, rigid, metal or plastic pipe or wand 12 of about 2 to about 4 inches in diameter, typically about 3 to about 4 inches in diameter and having smooth internal wall surfaces. Although it may be permanently affixed thereto, pipe 12 is normally releasably attached at its rearward end to the distal end of a flexible delivery conduit 14 via suitable means 16 such as adhesive tape, threading, clamp means, or the like. If present, pipe 12 may range in length from about the width of a user's palm, i.e., about 4 inches, up to about 8 feet whereby the pipe may be manually grasped and manipulated to dispense insulation to open areas such as attics to confined and/or inaccessible areas such as, for example, the void spaces between the interior and exterior walls of a building. As is known, flexible delivery conduit 14 normally ranges from about 2.5 to about six inches in diameter and may be fabricated from smooth-walled or corrugated plastic, rubber or rubber-like tubing.

A typical, although not limitative, pneumatically delivered loose-fill insulation comprises macerated glass fiber whose individual fiber lengths may range from about 0.25 inches to about 2.0 inches and diameters may range from about 1.0 to 10.0 microns. The insulation may optionally include binders or other additives to enhance its cohesiveness, flowability, durability or other beneficial processing or performance characteristics. With or without binders, however, the density of such materials as presently deposited by conventional dispensing apparatus such as apparatus 10 shown in FIG. 1 is about 0.4 to about 0.5 lb/ft$^3$. Because presently available loose-fill insulation delivery system dispensing apparatus have no structure for mechanically separating or "opening" the insulation as it passes through the flexible delivery tube and optional wand, loose-fill insulation material is frequently dispensed as a non-uniform flow of compressed masses or clumps which, as discussed above, does not optimize the insulative capability of the installed insulation material. This is especially true when binders and other additives are present in the insulation.

Figure 2:
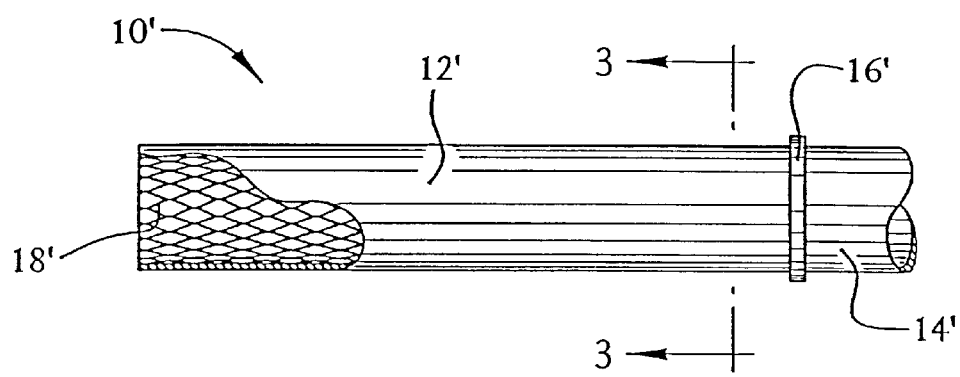
FIG. 2 is a partially cut-away side view of a loose-fill insulation dispensing apparatus constructed in accordance with the present invention.
Figure 3:
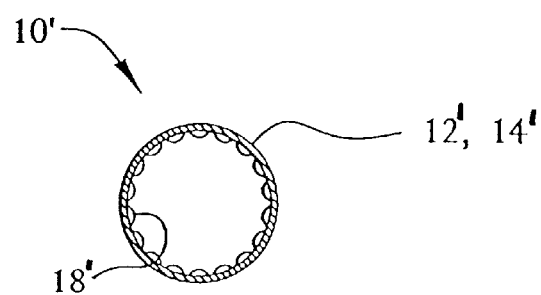
FIG. 3 is a cross-sectional view taken along line 3—3 of FIG. 2.

FIGS. 2 and 3 illustrate a first embodiment of a loose-fill insulation delivery system dispensing apparatus 10' according to the present invention. Similar to dispensing apparatus 10 of FIG. 1, apparatus 10' may include an optional lightweight, rigid, metal or plastic pipe or wand 12'. Although it may be permanently affixed thereto, pipe 12' is normally releasably attached at its rearward end to the distal end of a flexible delivery conduit 14' via suitable means 16' such as adhesive tape, threading, clamp means, quick connect/disconnect fitting, or the like.

Apparatus 10' includes an insert 18' for mechanically separating the insulation material prior to discharge from the delivery conduit 14' or wand 12'. Separating insert 18' may comprise any means for establishing a relieved, textured or otherwise rough surface on the interior wall of the delivery conduit and/or wand (if present). Separating insert 18' preferably has means in the form of elements or portions that project radially inwardly into the loose-fill insulation flow path of the delivery conduit 14' and/or wand 12'. The extent to which separating insert 18' project in the flow path should not be so great as to detrimentally obstruct or clog the flow path during operation of apparatus 10', such as for example, about 0.1–0.25 inches. However, it should be sufficient to condition or "open" the insulation material in such a way that the insulation material is discharged in a more substantially uniform density stream of fibers and/or particles.

The dimensions and accessibility of the building spaces to be insulated, coupled with the loose-fill insulation chosen for installation, dictate the appropriate diameters of delivery conduit 14' and wand 12' and whether a wand is desirable or necessary. It will be understood, therefore, that the dimensions and other structural characteristics of separating insert 18' may vary considerably. For currently available loose-fill glass fiber insulation materials, and for the ranges of the diameters for the delivery conduit and wand mentioned above, suitable separating insert 18' include substantially tubular textured metal inserts formed from embossed or punched sheet metal, metal or polymer mesh, scrim, woven or non-woven fabric, grip strut metal, expanded metal, or the like having, lengths of from about 24 to about 36 inches. Grip strut metal suitable for this purpose include 4¾"×1½"× 14 GA, 4¾"×2"×14 GA, 24"×1½"×12 GA, 24"×2"×14 GA, 24"×2"×12 GA grip strut metal marketed by Hoover Steel, Inc. of Schwenksville, Pa. Suitable expanded metal includes ¾×16, ¾×9 and 1½×9 expanded metal having respective short and long opening dimensions of 0.813" and 1.750", 0.688" and 1.562", and 1.125" and 2.375", which is also marketed by Hoover Steel, Inc. of Schwenksville, Pa. The separation insert 18', if made of metal, should be corrosion resistant. Ideal examples of metal useful for such purposes include stainless steel and galvanized steel, for example.

To form a first exemplary embodiment of the tubular insulation separating insert 18', a substantially rectangular piece of metal of desired length and width dimensions is first cut from a sheet of such metal and thereafter rolled and inserted into delivery conduit 14' and/or wand 12' (if present). The installer should take care to gently roll and not fold the metal during formation of tubular insulation separating insert 18' and its insertion into delivery conduit 14' and/or wand 12'. That is to say, the installer should assure that the elastic limit of the metal is not exceeded and permanent folds or creases are not formed in the metal. In this way, the inherent "memory" of the flexible yet resilient metal, i.e., the metal's tendency to return to its unrolled state, causes the metal to expand outwardly until its outer surface comes into firm frictional contact with the interior wall of the delivery conduit 14' and/or wand 12' (if present). And, if properly installed, the array of metal edges of the textured metal embed themselves slightly into the interior wall of the delivery conduit 14' and/or wand 12' and anchor the separating insert therewithin so as to resist dislodgement of the separating insert during operation of apparatus 10'.

It will be appreciated that any other flexible and resilient metal and/or, plastic material possessing the appropriate textural and/or material memory characteristics described above may be used as an alternative to grip strut metal or expanded metal for separating insert 18' in the loose-fill insulation dispensing apparatus 10' of the present invention. Furthermore, if additional anchorage of separating insert 18' is desired or necessary, the installer may fixedly secure the separating insert to delivery conduit 14' and/or wand 12' with any suitable fastening means including a melt-bond, screws, rivets, staples, ties or other mechanical fasteners, adhesives, or combinations thereof. It is generally desirable for manipulability and safety purposes that all or substantially all of separating insert 18' be disposed within the delivery conduit 14' and/or wand 12'.

Moreover, although shown as being positioned adjacent the discharge or outlet end of delivery conduit 14' and/or in wand 12' (if present), it has been discovered that successful results also may be achieved by placing separating insert 18' adjacent the opposite or intake end thereof that is connectable to a source of loose-fill insulation material as described above.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Apparatus for dispensing loose-fill insulation material comprising:
   a flexible delivery conduit for conveying loose-fill insulation material from a source of loose-fill insulation material and for dispensing loose-fill insulation material at a desired location; and
   an insert disposed within said conduit for separating loose-fill insulation material dispensed by said conduit,
   wherein said insert is disposed in said conduit, and permitted to expand into frictional contact with an internal surface of said conduit.

2. Apparatus for dispensing loose-fill insulation material comprising:
   a flexible delivery conduit for conveying loose-fill insulation material from a source of loose-fill insulation material and for dispensing loose-fill insulation material at a desired location; and
   an insert disposed within said conduit for separating loose-fill insulation material dispensed by said conduit, wherein said insert comprises a metal or plastic tubular member.

3. The apparatus of claim 2 wherein said insert is disposed at an intake end of said conduit.

4. The apparatus of claim 2 wherein said insert is disposed adjacent a discharge end of said conduit.

5. The apparatus of claim 4 wherein said insert establishes a textured surface on the interior wall of said conduit.

6. The apparatus of claim 5 wherein said insert includes portions that project radially inwardly into a loose-fill insulation path of said conduit.

7. The apparatus of claim 5 wherein said insert is an expandable metal mesh.

8. The apparatus of claim 5 wherein said insert is grip strut metal.

9. The apparatus of claim 5 wherein said insert is from about 24 to about 36 inches in length.

10. Apparatus for dispensing loose-fill insulation material comprising:
    a flexible delivery conduit for conveying loose-fill insulation material from a source of loose-fill insulation material; a rigid pipe connected to an end of said conduit for dispensing loose-fill insulation material at a desired location; and
    a textured insert carried by at least one of said conduit and said pipe for separating loose-fill insulation material dispensed by said pipe.

11. The apparatus of claim 10 wherein said insert is fixed within said conduit.

12. The apparatus of claim 10 wherein said insert is disposed at an intake end of said conduit.

13. The apparatus of claim 10 wherein said insert is disposed adjacent a discharge end of said conduit.

14. The apparatus of claim 10 wherein said insert comprises a metallic mesh or tube.

15. The apparatus of claim 10 wherein said insert comprises an expandable tubular member.

16. The apparatus of claim 10 wherein said insert includes portions that project radially inwardly into a loose-fill insulation flow path of at least one of said conduit and said pipe by at least 0.1 inch.

17. The apparatus of claim 15 wherein said insert is expanded metal mesh.

18. The apparatus of claim 15 wherein said insert is grip strut metal.

19. The apparatus of claim 15 wherein said insert is from about 24 to about 36 inches in length.

20. A flexible and resilient loose-fill insulation material separating device for use with at least one of a flexible delivery conduit for conveying loose-fill insulation material from a source of loose-fill insulation material and a rigid pipe connectable to an end of the flexible delivery conduit for dispensing loose-fill insulation material at a desired location, said device comprising:
    an outer surface operable to contact an inner surface of at least one of the flexible delivery conduit and the rigid pipe; and
    an insert for establishing a rough surface on the interior wall of at least one of the conduit and the pipe.

21. The device of claim 20 wherein the device is disposed at an intake end of the conduit.

22. The device of claim 20 wherein the device is disposed adjacent a discharge end of the conduit.

23. The device of claim 20 wherein said means for establishing a rough surface includes portions that project radially inwardly into a loose-fill insulation flow path of at least one of the conduit and the pipe.

24. The device of claim 23 wherein the device is fabricated from expanded metal mesh.

25. The device of claim 23 wherein the device is fabricated from grip strut metal.

26. The device of claim 23 wherein the device is from about 24 to about 36 inches in length.

27. An apparatus for dispensing loose-fill insulation material comprising:

a flexible deli very conduit for conveying loose-fill insulation material from a source of loose-fill insulation material and for dispensing loose-fill insulation material at a desired location; and a separation member carried by said conduit, wherein the separation member comprises a sheath disposed within the conduit with portions that project radially inwardly into a loose-fill insulation flow path of said conduit.

* * * * *